(12) United States Patent
Iwasa et al.

(10) Patent No.: US 8,057,553 B2
(45) Date of Patent: Nov. 15, 2011

(54) METHOD FOR MANUFACTURING SOLID ELECTROLYTIC CAPACITOR AND SOLID ELECTROLYTIC CAPACITOR

(75) Inventors: Tetsuro Iwasa, Osaka (JP); Hiroshi Nakajima, Osaka (JP); Seiji Omura, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 912 days.

(21) Appl. No.: 12/049,779

(22) Filed: Mar. 17, 2008

(65) Prior Publication Data
US 2008/0222862 A1 Sep. 18, 2008

(30) Foreign Application Priority Data

Mar. 15, 2007 (JP) .................................. 2007-66446
Nov. 15, 2007 (JP) ................................ 2007-296174

(51) Int. Cl.
*H01G 9/00* (2006.01)
(52) U.S. Cl. ....................................... 29/25.03; 438/239
(58) Field of Classification Search ................. 29/25.03; 438/237
See application file for complete search history.

(56) References Cited

U.S. PATENT DOCUMENTS

| 4,780,796 A | 10/1988 | Fukuda et al. |
| 7,125,764 B2* | 10/2006 | Taketani et al. ............... 438/239 |
| 7,754,276 B2* | 7/2010 | Qiu et al. ......................... 427/79 |
| 2006/0124888 A1* | 6/2006 | Morrison, Jr. ............. 252/62.3 Q |
| 2007/0171597 A1* | 7/2007 | Merker et al. ................. 361/523 |
| 2008/0086859 A1* | 4/2008 | Ito ................................. 29/25.03 |

FOREIGN PATENT DOCUMENTS

| CN | 101162653 A | 4/2008 |
| JP | 4-74853 B2 | 11/1992 |

OTHER PUBLICATIONS

Chinese Office Action dated Nov. 10, 2010, issued in corresponding Chinese Patent Application No. 200810086518.6.

* cited by examiner

*Primary Examiner* — Kiesha Bryant
*Assistant Examiner* — Ali Naraghi
(74) *Attorney, Agent, or Firm* — Westerman, Hattori, Daniels & Adrian, LLP

(57) ABSTRACT

A method for manufacturing a solid electrolytic capacitor having a solid electrolyte layer containing an electrically conductive polymer layer formed by electrolytic oxidative polymerization, comprising: forming a dielectric layer on a surface of an anode element containing a valve metal; forming an electrically conductive precoat layer on the dielectric layer; and performing electrolytic oxidative polymerization in an electrolytic polymerization solution containing a monomer, a dopant agent and a chelating agent to form the electrically conductive polymer layer on the electrically conductive precoat layer.

9 Claims, No Drawings

METHOD FOR MANUFACTURING SOLID ELECTROLYTIC CAPACITOR AND SOLID ELECTROLYTIC CAPACITOR

BACKGROUND OF THE INVENTION

1. Field of the Invention

The invention relates to methods for manufacturing solid electrolytic capacitors each including a solid electrolyte layer containing an electrically conductive polymer layer formed by electrolytic oxidative polymerization.

2. Description of the Related Art

With respect to a solid electrolytic capacitor having an anode element made of a valve metal, a dielectric layer formed on a surface of the anode element, and a solid electrolyte layer containing an electrically conductive polymer layer and formed on the dielectric layer, the chemical oxidative polymerization method and the electrolytic oxidative polymerization method have been conventionally known as a method of producing the electrically conductive polymer layer. The former chemical oxidative polymerization method refers to a method of producing an electrically conductive polymer by allowing an oxidizing agent to act on a monomer and chemically oxidative polymerizing the monomer, and the latter electrolytic oxidative polymerization method refers to a method of producing an electrically conductive polymer by passing an electric current through an electrolytic polymerization solution containing a monomer to electrolytic oxidative polymerize the monomer. Generally, the electrolytic oxidative polymerization method can control conditions for polymerization easier than the chemical oxidative polymerization method and can produce an electrically conductive polymer excellent in electrical conductivity, mechanical strength and homogeneity, while the electrolytic oxidative polymerization method needs to use a more complicated manufacturing apparatus.

In order to form an electrically conductive polymer layer for use in a solid electrolytic capacitor by electrolytic oxidative polymerization method, an electrically conductive precoat layer of manganese dioxide produced by thermal decomposition of manganese nitrate or an electrically conductive polymer produced by chemical oxidative polymerization is first formed on a dielectric layer, because the dielectric layer, which is formed on the surface of a valve metal constituting an anode element, is an insulating material. Then, for example, the electrically conductive precoat layer and a metal plate of stainless steel or the like are used as an anode and a cathode, respectively, and an electric current is allowed to flow between the anode and the cathode in an electrolytic polymerization solution containing a monomer and a dopant agent also serving as a supporting electrolyte, so that the monomer is subjected to electrolytic oxidative polymerization to form an electrically conductive polymer layer (see, for example, Japanese Examined Patent Publication No. H04-74853).

However, there is a problem in which even using a solid electrolyte layer containing an electrically conductive polymer layer formed by electrolytic oxidative polymerization as described above, leak current in the resulting solid electrolytic capacitor is not reduced as expected, and when the electrolytic oxidative polymerization using the electrolytic polymerization solution described above is performed on an industrial scale, the production rate of solid electrolytic capacitors with large leak current becomes high.

SUMMARY OF THE INVENTION

The invention has been made in order to solve the problems described above, and it is an object of the present invention to stably produce, on an industrial scale, a solid electrolytic capacitor with superior leak current characteristic that has a solid electrolyte layer containing an electrically conductive polymer layer formed by electrolytic oxidative polymerization.

According to the investigation for the present invention, it has been found that contaminant metal ions in the electrolytic polymerization solution are a cause of the deterioration of leak current characteristic or a cause of the high production rate of defectives with large leak current. Based on the findings, the present invention provides methods for stably manufacturing solid electrolytic capacitors with superior leak current characteristic. Namely, according to one aspect of the present invention, there is provided a method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer; and performing electrolytic oxidative polymerization in an electrolytic polymerization solution containing a monomer, a dopant agent and a chelating agent to form the electrically conductive polymer layer on the electrically conductive precoat layer.

According to another aspect of the present invention, there is provided a method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer;

preparing a first electrolytic polymerization solution by bringing an electrolytic polymerization solution containing a monomer and a dopant agent into contact with a first cation-exchange resin; and performing electrolytic oxidative polymerization in the first electrolytic polymerization solution to form the electrically conductive polymer layer on the electrically conductive precoat layer.

According to the methods described above, the solid electrolytic capacitor with superior leak current characteristic can be stably produced on an industrial scale.

Other objects, features and advantages of the present invention will become more fully understood from the detailed description given hereinbelow.

DETAILED DESCRIPTION OF THE PREFERRED EMBODIMENTS

According to the investigation for the present invention, it is considered that when electrically conductive polymer layers is formed by electrolytic oxidative polymerization, deterioration of leak current characteristic and increase of the production rate of solid electrolytic capacitors with large leak current result from the effect of metal ions that are mixed into the electrolytic polymerization solution in the process of preparing the electrolytic polymerization solution or in the electrolytic oxidative polymerization process. Specifically, when metal components such as a metal pipe for supplying the electrolytic polymerization solution, a metal plate cathode or anode of stainless steel or the like used in the electrolytic oxidative polymerization process, and a metal anode pin of stainless steel or the like used for allowing an electrically conductive precoat layer to serve as an anode are brought into contact with the electrolytic polymerization solution, metal ions such as $Fe^{2+}$, $Mn^{2+}$ and $Cr^{2+}$ ions are mixed into the electrolytic polymerization solution from the metal components. Particularly, when the electrically conductive polymer layer is formed by electrolytic oxidative polymerization, an acid electrolytic polymerization solution is generally used. Therefore, the metal components in contact with the acid electrolytic polymerization solution can significantly corrode so that the amount of elution of metal ions such as $Fe^{2+}$ ions to the electrolytic polymerization solution can significantly increase. There is also a possibility that raw materials for use in preparing the electrolytic polymerization solution, such as solvents, may contain metal ions, although the metal ion content should be very low. If electrolytic oxidative polymerization is performed in such a metal ion-containing electrolytic polymerization solution, metal ions such as $Fe^{2+}$ ions can be electrolytically oxidized into high-valent metal ions such as $Fe^{3+}$ ions on or near an electrically conductive precoat layer acting as an anode in the process of the electrolytic oxidative polymerization by passing an electric current. This process interferes with the electrolytic oxidative polymerization of a monomer on the electrically conductive precoat layer and thus inhibits the production of electrically conductive polymer by electrolytic oxidative polymerization. The high-valent metal ions produced by electrolytic oxidation, such as $Fe^{3+}$ ions, also function as an oxidizing agent, so that chemical oxidative polymerization tends to occur as a side reaction in addition to the electrolytic oxidative polymerization. The high-valent metal ions functioning as an oxidizing agent are reduced to low-valent metal ions such as Fe ions by the chemical oxidative polymerization, and the low-valent metal ions are electrolytically oxidized again. In addition, the high-valent metal ions produced by electrolytic oxidation, such as $Fe^{3+}$ ions, can be reduced on or near the metal plate cathode, so that a chemical short circuit tends to occur to cause a current loss and to hinder efficient electrolytic oxidative polymerization. As a result, it can be difficult to sufficiently form the electrically conductive polymer layer on the electrically conductive precoat layer by electrolytic oxidative polymerization, and electrically conductive polymers produced by the chemical oxidative polymerization can be mixed into the electrically conductive polymer layer produced by electrolytic oxidative polymerization, so that leak current characteristic of the solid electrolytic capacitor can be deteriorated and the production rate of defectives with large leak current can be increased.

Based on the findings described above, an investigation has been made of methods for reducing the effect of the contaminant metal ions in the electrolytic polymerization solution. As a result, it has been found that a method that includes performing electrolytic oxidative polymerization with a chelating agent-containing electrolytic polymerization solution and another method that includes previously bringing an electrolytic polymerization solution into contact with a cation-exchange resin before electrolytic oxidative polymerization and performing the electrolytic oxidative polymerization with the ion-exchanged electrolytic polymerization solution, are useful in reducing the effect of the contaminant metal ions in the electrolytic polymerization solution during the electrolytic oxidative polymerization process, so that leak current characteristic can be improved and that the production rate of defectives with large leak current can also be reduced. Each of the methods is described below in detail.

First Embodiment

In this embodiment, a solid electrolytic capacitor is produced by sequentially forming a dielectric layer, a solid electrolyte layer as a cathode layer and a cathode lead layer, on the peripheral surface of an anode element that is made of a valve metal and provided with an anode lead. The valve metal refers to a metal forming closely-packed and durable dielectric layer. Examples of such a valve metal include tantalum, niobium, aluminum, and titanium. The dielectric layer on the surface of the valve metal may be typically formed by a process including: immersing an anode element of a valve metal in an aqueous phosphoric acid solution; and then electrolytically oxidizing the anode element.

A solid electrolyte layer is then formed as a cathode layer on the dielectric layer. In the process of forming the solid electrolyte layer, an electrically conductive precoat layer is first formed on the dielectric layer. For example, the electrically conductive precoat layer may be an oxide conductive layer made of manganese dioxide or the like, an organic semiconductor layer made of a TCNQ complex or the like, or an electrically conductive polymer layer produced by chemical oxidative polymerization of a monomer with an oxidizing agent. In particular, the electrically conductive polymer layer produced by chemical oxidative polymerization is preferred.

The process of forming the electrically conductive precoat layer by chemical oxidative polymerization may include: first immersing the anode element provided with the dielectric layer in a solution containing an oxidizing agent and a dopant agent for providing a dopant, or spraying or applying the solution on or to the anode element to deposit the oxidizing agent and the dopant agent on the dielectric layer; then immersing the anode element in a chemical oxidative polymerization solution containing a monomer; and drying the solution to perform chemical oxidative polymerization of the monomer so that an electrically conductive polymer layer is formed on the dielectric layer. Examples of the monomer include pyrrole, thiophene, furan and aniline. Examples of the oxidizing agent include a generally known oxidizing agent such as halogens and peroxides. Examples of the dopant agent include: a protic acid such as sulfuric acid or nitric acid; and a surfactant such as alkyl sulfonate. When a compound acting as both the oxidizing agent and the dopant, such as halogen moieties, transition metal halides, and protic acids, is used, the compound may be added to the solution.

An electrically conductive polymer layer is then formed on the electrically conductive precoat layer by electrolytic oxidative polymerization. In this embodiment, the electrolytic oxidative polymerization is performed using an electrolytic polymerization solution containing a monomer, a dopant agent and a chelating agent. Specifically, a chelating agent is added to the electrolytic polymerization solution so that carboxylate ions derived from the chelating agent serve to capture contaminant metal ions in the electrolytic polymerization solution. Thus, metal ions such as $Fe^{2+}$ ions can be prevented from being oxidized on the electrically conductive precoat layer so that the electrolytic oxidative polymerization can be performed in an electrolytic polymerization solution with less metal ions such as $Fe^{3+}$, which would otherwise be produced by electrolytic oxidation and function as an oxidizing agent. As a result, the side reactions such as chemical oxidative polymerization and chemical short circuit are suppressed so that the electrolytic oxidative polymerization can be efficiently performed and that mixing of electrically conductive polymers produced by chemical oxidative polymerization in the electrically conductive polymer layer can be prevented.

The preferable chelating agent has a high stability constant with a metal ion. For example, such a chelating agent may be at least one aminocarboxylic acid type chelating agent selected from the group consisting of ethylenediaminetetraacetic acid, triethylenediaminetetraacetic acid, diethylenetriaminepentaacetic acid, hydroxyethylenediaminetriacetic acid, glycol ether diaminetetraacetic acid, nitrilotriacetic acid, triethylenetetraminehexaacetic acid, hydroxyiminodiacetic acid, dihydroxyethylglycine, hydroxyiminodisuccinic acid, ethylenediaminedisuccinic acid, and salts of all of the acids. Among them, chelating agents in which the carboxylate salt is replaced by at least one salt selected from the group consisting of a sodium salt, a potassium salt and an ammonium salt are preferred, because they are highly soluble in the electrolytic polymerization solution and allow an exchange between the metal ions in the electrolytic polymerization solution and $Na^+$ ions or other cations that do not inhibit the electrolytic oxidative polymerization.

The content of the chelating agent in the electrolytic polymerization solution may be appropriately selected depending on the type of the chelating agent. The electrolytic polymerization solution may be prepared by mixing and stirring the chelating agent, the monomer and the dopant agent in a solvent. Examples of the monomer include pyrrole, thiophene, furan and aniline. In order to form an electrolytic polymerization solution with a desired electric conductivity, the dopant agent preferably functions as a supporting electrolyte. For example, alkylnaphthalenesulfonic acid or the like may be used as such a dopant agent. The solvent to be used may be a single or mixed solvent of one or more of protic solvents such as water, ethanol and methanol and aprotic solvents such as acetonitrile, propylene carbonate and N,N-dimethylformamide.

Known conventional methods may be used in forming the electrically conductive polymer layer by electrolytic oxidative polymerization. For example, the electrolytic polymerization solution may be added to an electrolytic cell in which a metal anode pin made of stainless steel or the like and a metal plate made of stainless steel or the like are displaced. The element including the dielectric layer and the electrically conductive precoat layer formed on the valve metal is then immersed in the electrolytic polymerization solution. After the metal anode pin is brought into contact with the electrically conductive precoat layer, the metal plate and the electrically conductive precoat layer are used as a cathode and an anode, respectively, an electric current is passed through the anode and the cathode, so that an electrically conductive polymer layer is formed.

In this embodiment, after an electrically conductive polymer layer (a first solid electrolyte layer) produced by electrolytic oxidative polymerization is formed, other electrically conductive polymer layer (a second solid electrolyte layer) produced by chemical oxidative polymerization may be further formed on the first solid electrolyte layer. In the process of forming the electrically conductive polymer layer produced by chemical oxidative polymerization, a monomer, a dopant agent and an oxidizing agent same as those used in the process of forming the electrically conductive precoat layer may be used.

After the solid electrolyte layer is formed as described above, a cathode lead layer including a graphite layer and a silver paste layer is formed on the solid electrolyte layer so that the capacitor element is prepared. Thereafter, a cathode lead frame and an anode lead flame are respectively extracted from the capacitor element, and the capacitor element is covered with an exterior coating resin such as epoxy resin, so that solid electrolytic capacitor is produced.

Second Embodiment

In this embodiment, the steps of: forming a dielectric layer on a surface of a valve metal constituting an anode element; forming an electrically conductive precoat layer on the dielectric layer; preparing a solid electrolytic capacitor element after the formation of a solid electrolyte layer; and preparing a solid electrolytic capacitor are the same as those of the first embodiment. However, this embodiment differs from the first embodiment in that the electrolytic polymerization solution contains no chelating agent and that the electrolytic polymerization solution is previously brought into contact with a cation-exchange resin before the electrolytic oxidative polymerization, and the electrolytic oxidative polymerization is performed using the ion-exchanged electrolytic polymerization solution.

As described above, metal ions can be mixed into the electrolytic polymerization solution in the process of preparing the electrolytic polymerization solution so that a relatively large amount of $Fe^{2+}$ and other metal ions that can affect the electrolytic oxidative polymerization can be present in the electrolytic polymerization solution at the initial stage of the electrolytic oxidative polymerization. In such a case, the production of the electrically conductive polymer by electrolytic oxidative polymerization tends to be hindered. In this embodiment, therefore, the electrolytic polymerization solution is previously brought into contact with a first cation-exchange resin before the electrolytic oxidative polymerization so that an ion-exchanged first electrolytic polymerization solution in which the contaminant metal ions are exchanged for cations not inhibiting the electrolytic oxidative polymerization is prepared. The electrolytic oxidative polymerization is performed using the ion-exchanged first electrolytic polymerization solution, so that metal ions such as $Fe^{2+}$ ions can be prevented from being oxidized on the electrically conductive precoat layer and that the electrolytic oxidative polymerization can be performed in an electrolytic polymerization solution with less $Fe^{3+}$ and other oxidizing metal ions which would otherwise be produced by electrolytic oxidation and function as an oxidizing agent. As a result, the side reactions such as chemical oxidative polymerization and chemical short circuit are suppressed so that the electrolytic oxidative polymerization can be efficiently performed and that the amount of electrically conductive polymers produced by chemical oxidative polymerization and mixed into the electrically conductive polymer layer can be reduced. Particularly, in the first embodiment, a chelating agent is added to the electrolytic polymerization solution in order to reduce the effect of metal ions, and, therefore, the chelating agent can remain as an impurity in the electrolytic polymerization solution after it captures the polymerization-inhibiting metal ions. In this embodiment, however, the first electrolytic polymerization solution does not contain such a substance useless for the polymerization reaction (the unreacted chelating agent or the chelating agent that has captured the electrolytic oxidative polymerization-inhibiting metal ions) after the electrolytic polymerization solution is brought into contact with the first cation-exchange resin, so that the polymerization reaction is allowed to proceed better.

The first cation-exchange resin may be any cation-exchange resin capable of exchanging the electrolytic polymerization-inhibiting contaminant metal ions in the electrolytic polymerization solution for other cations. Among them, at least one selected from the group consisting of an acid (H)-type cation-exchange resin and a metal salt-type cation-exchange resin is preferred, and at least one selected from the group consisting of an acid (H)-type cation-exchange resin and an alkali metal salt-type cation-exchange resin is more preferred. When an acid (H)-type cation-exchange resin is used, the metal ions are exchanged for hydrogen ions. When an alkali metal salt-type cation-exchange resin is used, the metal ions are exchanged for Na⁺ ions or other cations that are not turned into high-valent ions by electrolytic oxidation. Thus, the electrolytic oxidative polymerization is not inhibited, even though such cations exist in the electrolytic polymerization solution. In particular, the acid (H)-type cation-exchange resin is preferred, because it does not increase the amount of metal ions in the electrolytic polymerization solution. Examples of commercially obtainable cation-exchange resin include: an acid (H)-type cation-exchange resin such as Amberjet 1020H, Amberjet 1020H, Amberjet 1024H, Amberlight 1006FH, Amberlight FPC3500 or Amberlight IRC76 (available from Organo Corporation); an alkali metal-type cation-exchange resin such as Amberlight IR120BNa, Amberlight IR124Na, Amberlight 200CTNa, Amberlight 252Na or Amberlight IRC748 (available from Organo Corporation).

In this embodiment, the chelating agent-free electrolytic polymerization solution may be prepared similarly to the process of the first embodiment. While the ion-exchanged first electrolytic polymerization solution may be prepared by any method including bringing the electrolytic polymerization solution into contact with the first cation-exchange resin, it is preferably prepared by a method including allowing the electrolytic polymerization solution to pass through a column filled up the first cation-exchange resin, because the process is relatively easy.

In this embodiment, the electrolytic oxidative polymerization is preformed using the process of the first embodiment, except that the first electrolytic polymerization solution prepared as described above is used, so that an electrically conductive polymer layer is formed on the electrically conductive precoat layer.

In this embodiment, the first electrolytic polymerization solution being used may be further brought into contact with a second cation-exchange resin in the course of the electrolytic oxidative polymerization so that an ion-exchanged second electrolytic polymerization solution can be prepared. The electrolytic oxidative polymerization may be further performed in the ion-exchanged second electrolytic polymerization solution in the process of forming the electrically conductive polymer layer. Specifically, by further bringing the first electrolytic polymerization solution into contact with the second cation-exchange resin in the course of the electrolytic oxidative polymerization, $Fe^{2+}$ and other metal ions eluted from the displaced metal components in the electrolytic oxidative polymerization process can be exchanged for other cations not inhibiting the electrolytic oxidative polymerization, so that the effect of the metal ions can be further reduced. The first electrolytic polymerization solution may be brought into contact with the second cation-exchange resin by the same method as used in bringing the prepared electrolytic polymerization solution into contact with the first cation-exchange resin. In this case, the type of the second cation-exchange resin may be the same as or different from the type of the first cation-exchange resin. For the contact, the electrolytic oxidative polymerization may be stopped, and then the first electrolytic polymerization solution may be allowed to pass through a column filled up the second cation-exchange resin, or the first electrolytic polymerization solution may be circulated between the electrolytic cell and the column, while the polymerization reaction is allowed to proceed.

Other Embodiment

In the second embodiment, when an electrolytic oxidative polymerization is performed using a first electrolytic polymerization solution and a second electrolytic polymerization solution, those electrolytic polymerization solutions may contain a chelating agent of the first embodiment. According to the method above, the chelating agent serves to capture contaminant metal ions in those electrolytic polymerization solutions during the electrolytic oxidative polymerization.

In the following, the present invention is described in more detail in connection with examples. The present invention, however, is not limited to them.

EXAMPLES

Example 1

First, a tantalum sintered body was immersed in an aqueous phosphoric acid solution, and then a voltage was applied to perform electrolytically oxidization so that a dielectric layer was formed on the surface of the tantalum sintered body. Next, an aqueous solution containing an oxidizing agent and a dopant agent was prepared. The tantalum sintered body provided with the dielectric layer was immersed in the aqueous solution, and then chemical oxidative polymerization is performed to form an electrically conductive precoat layer of polypyrrole on the dielectric layer by exposing the sintered body to pyrrole.

Separately from the above, pyrrole (0.02 mol/l) as a monomer, alkylnaphthalenesulfonic acid (0.004 mol/l) as a dopant agent and ethylenediaminetetraacetic acid disodium salt ($6.3 \times 10^{-4}$ mol/l) as a chelating agent were added to water and mixed and stirred to form an acid electrolytic polymerization solution.

The electrolytic polymerization solution prepared as described above was added to an electrolytic cell equipped with an anode pin made of stainless steel and a metal plate cathode made of stainless steel. The tantalum sintered body provided with the dielectric layer and the electrically conductive precoat layer was immersed in the electrolytic polymerization solution, and then the stainless steel anode pin was brought into contact with the electrically conductive precoat layer. Electrolytic oxidative polymerization was performed by passing an electric current through the anode and the cathode for 6 hours so that an electrically conductive polymer layer of polypyrrole was formed on the electrically conductive precoat layer.

A graphite layer and a silver paste layer were then sequentially formed on the electrically conductive polymer layer so that a capacitor element was prepared. Thereafter, a cathode lead frame and an anode lead frame were connected to the silver paste layer and the anode lead, respectively, in the capacitor element. After the connection of each lead frame, the capacitor element except for part of the anode and cathode lead frames was coated with an exterior resin, and each exposed lead frame was bent along the exterior, so that a solid electrolytic capacitor was prepared.

Example 2

A solid electrolytic capacitor was prepared using the process of Example 1, except that the electrolytic polymerization solution containing $1.0 \times 10^{-2}$ mol/l of ethylenediaminetetraacetic acid disodium salt was used in performing the electrolytic oxidative polymerization.

Example 3

An electrolytic polymerization solution was prepared using the process of preparing the electrolytic polymerization solution of Example 1, except that the chelating agent was not added. The amount of Fe ions in the electrolytic polymerization solution measured by ICP method was $3.6 \times 10^{-5}$ mol/l.

The electrolytic polymerization solution was then allowed to pass through a column filled up an acid (H) type cation-exchange resin (Amberjet 1020H available from Organo Corporation) to prepare an ion-exchanged first electrolytic polymerization solution. The amount of Fe ions in the first electrolytic polymerization solution measured by ICP method was $1.6 \times 10^{-5}$ mol/l, and it was confirmed that the amount of Fe ions was reduced by the ion exchange process.

A solid electrolytic capacitor was prepared using the process of Example 1, except that the electrolytic oxidative polymerization was performed by the passage of electric current for 6 hours using the ion-exchanged first electrolytic polymerization solution.

Example 4

According to the process of Example 3, the electrolytic oxidative polymerization was first performed by the passage of electric current for 3 hours using the ion-exchanged first electrolytic polymerization solution. The passage of electric current was then stopped, and the first electrolytic polymerization solution in the course of the polymerization reaction was allowed to pass through a column filled up an acid (H) type cation-exchange resin, which was the same type as used in Example 3, so that a second electrolytic polymerization solution was prepared. The amounts of Fe ions in the electrolytic polymerization solution before and after the ion exchange process, measured by ICP method, were $2.1 \times 10^{-5}$ mol/l and $1.2 \times 10^{-5}$ mol/l, respectively, and it was confirmed that the amount of Fe ions was reduced by the ion exchange process. The electrolytic oxidative polymerization was further performed by the passage of electric current for 3 hours using the ion-exchanged second electrolytic polymerization solution. A solid electrolytic capacitor was prepared using the process of Example 3, except that the electrolytic oxidative polymerization was performed as described above.

Comparative Example 1

A solid electrolytic capacitor was prepared using the process of Example 1, except that the electrolytic polymerization solution without containing ethylenediaminetetraacetic acid disodium salt was used in performing the electrolytic oxidative polymerization.

In each of the examples and the comparative example, 500 solid electrolytic capacitors were prepared and measured for leak current, and the average of the measurements was calculated. With respect to the 500 solid electrolytic capacitors of each of the examples and the comparative example, the number of solid electrolytic capacitors with a leak current of 200 μA or more was evaluated as the number of defectives. The results are shown in Table 1.

TABLE 1

|  | Leak Current (μA) | Number of Defectives (per 500 capacitors) |
| --- | --- | --- |
| Ex. 1 | 5.9 | 7 |
| Ex. 2 | 3.9 | 4 |
| Ex. 3 | 3.1 | 3 |
| Ex. 4 | 2.4 | 3 |
| C. Ex. 1 | 7.4 | 15 |

Table 1 indicates that the leak current and the production rate of defectives with a large leak current are both relatively low with respect to the solid electrolytic capacitors of Examples 1 and 2 each having an electrically conductive polymer layer formed by electrolytic oxidative polymerization using an electrolytic polymerization solution containing ethylenediaminetetraacetic acid disodium salt of a chelating agent. It is believed that this is because the effect of the electrolytic oxidative polymerization-inhibiting contaminant metal ions in the electrolytic polymerization solution is reduced by the addition of ethylenediaminetetraacetic acid disodium salt to the electrolytic polymerization solution.

It is also apparent that the leak current and the production rate of defectives with a large leak current are both very low, with respect to the solid electrolytic capacitors of Example 3 each having an electrically conductive polymer layer formed by electrolytic oxidative polymerization using the first electrolytic polymerization solution with an Fe ion content reduced by the previous contact of the electrolytic polymerization solution with a cation-exchange resin and with respect to the solid electrolytic capacitors of Example 4 each having an electrically conductive polymer layer formed by electrolytic oxidative polymerization using the second electrolytic polymerization solution with an Fe ion content reduced by the further contact of the first electrolytic polymerization solution with a second cation-exchange resin in the course of the electrolytic oxidative polymerization. It is believed that this is because the Fe ion content is reduced by the contact of the electrolytic polymerization solution with the cation-exchange resin, and the contaminant metal ions in the electrolytic polymerization solution are exchanged for other cations, so that the electrolytic oxidative polymerization is performed in an electrolytic polymerization solution with a reduced content of metal ions which inhibit electrolytic oxidative polymerization.

As described above in detail, according to one aspect of the present invention, there is provided a method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer; and performing electrolytic oxidative polymerization in an electrolytic polymerization solution containing a monomer, a dopant agent and a chelating agent to form the electrically conductive polymer layer on the electrically conductive precoat layer.

According to the above feature, since the electrolytic polymerization solution contains a chelating agent, the chelating agent can capture contaminant metal ions in the electrolytic polymerization solution, so that the effect of the contaminant metal ions in the process of the electrolytic oxidative polymerization can be reduced.

In the method above, as the chelating agent, at least one selected from the group consisting of ethylenediaminetetraacetic acid, triethylenediaminetetraacetic acid, diethylenetriaminepentaacetic acid, hydroxyethylenediaminetriacetic acid, glycol ether diaminetetraacetic acid, nitrilotriacetic acid, triethylenetetraminehexaacetic acid, hydroxyiminodiacetic acid, dihydroxyethylglycine, hydroxyiminodisuccinic acid, ethylenediaminedisuccinic acid, and salts thereof is preferred. According to the above feature, since such chelating agents have a high stability constant with a metal ion, those chelating agents can sufficiently capture the contaminant metal ions in the electrolytic polymerization solution.

In the method above, as the salt, at least one selected from the group consisting of a sodium salt, a potassium salt and an ammonium salt is preferred. Such chelating agents are highly soluble in the electrolytic polymerization solution and allow an exchange between the metal ions in the electrolytic polymerization solution and Na⁺ ions or other cations that do not inhibit the electrolytic oxidative polymerization.

According to another aspect of the present invention, there is provided a method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer;

preparing a first electrolytic polymerization solution by bringing an electrolytic polymerization solution containing a monomer and a dopant agent into contact with a first cation-exchange resin; and performing electrolytic oxidative polymerization in the first electrolytic polymerization solution to form the electrically conductive polymer layer on the electrically conductive precoat layer.

According to the above feature, since the electrolytic polymerization solution is previously brought into contact with a first cation-exchange resin before the electrolytic oxidative polymerization, the contaminant metal ions can be exchanged for cations that do not inhibit the electrolytic oxidative polymerization. Therefore, the effect of the contaminant metal ions in the process of the electrolytic oxidative polymerization can be reduced.

In the method above, the first electrolytic polymerization solution being used may be further brought into contact with a second cation-exchange resin in the course of the electrolytic oxidative polymerization so that an ion-exchanged second electrolytic polymerization solution can be prepared, and the electrolytic oxidative polymerization may be further performed in the ion-exchanged second electrolytic polymerization solution to form the electrically conductive polymer layer.

Since the electrolytic oxidative polymerization is performed in the electrolytic polymerization solution equipped with metal components such as a metal plate and a metal anode pin by passing an electric current through the metal components, metal ions can be eluted into the electrolytic polymerization solution from the metal components. Therefore, by further bringing the first electrolytic polymerization solution into contact with the second cation-exchange resin in the course of the electrolytic oxidative polymerization, the effect of the contaminant metal ions eluted from the metal components into the electrolytic polymerization solution can be reduced.

In the method above, as the first cation-exchange resin and the second first cation-exchange resin, at least one selected from the group consisting of an acid (H)-type cation-exchange resin and a metal salt-type cation-exchange resin is preferred. By bringing the electrolytic polymerization solution into contact with at least one of those cation-exchange resins, the contaminant metal ions can be exchanged for hydrogen ions or metal ions that do not inhibit the electrolytic oxidative polymerization.

According to further another aspect of the present invention, there is provided solid electrolytic capacitors produced by the methods described above. According to the methods, since the effect of the contaminant metal ions in the electrolytic polymerization solution during the electrolytic oxidative polymerization process can be reduced, the electrolytic oxidative polymerization proceeds uniformly so that the solid electrolytic capacitor having a solid electrolyte layer containing an electrically conductive polymer layer densely formed by electrolytic oxidative polymerization can be produced.

Therefore, according to the present invention, even when a solid electrolytic capacitor having a solid electrolyte layer containing an electrically conductive polymer layer formed by electrolytic oxidative polymerization is produced on an industrial scale, the effect of contaminant metal ions in the electrolytic polymerization solution can be reduced so that the solid electrolytic capacitor with superior leak current characteristic can be stably produced.

The present application claims priority based on Japanese Patent Applications Nos. 2007-66446 filed on Mar. 15, 2007 and 2007-296174 filed on Nov. 15, 2007, the contents of which are hereby incorporated by reference in their entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

The invention claimed is:

1. A method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer; and performing electrolytic oxidative polymerization in an electrolytic polymerization solution containing a monomer, a dopant agent and a chelating agent to form the electrically conductive polymer layer on the electrically conductive precoat layer.

2. The method according to claim 1, wherein the chelating agent is at least one selected from the group consisting of ethylenediaminetetraacetic acid, triethylenediaminetetraacetic acid, diethylenetriaminepentaacetic acid, hydroxyethylenediaminetriacetic acid, glycol ether diaminetetraacetic acid, nitrilotriacetic acid, triethylenetetraminehexaacetic acid, hydroxyiminodiacetic acid, dihydroxyethylglycine, hydroxyiminodisuccinic acid, ethylenediaminedisuccinic acid, and salts thereof.

3. The method according to claim 2, wherein the chelating agent is at least one of said salts;

and at least one of said salts further comprises at least one selected from the group consisting of a sodium salt, a potassium salt and an ammonium salt.

4. A solid electrolytic capacitor produced by the method according to claim 1.

5. A method for manufacturing a solid electrolytic capacitor having a solid electrolyte layer containing an electrically conductive polymer layer formed by electrolytic oxidative polymerization, comprising:

forming a dielectric layer on a surface of an anode element containing a valve metal;

forming an electrically conductive precoat layer on the dielectric layer;

preparing a first electrolytic polymerization solution by bringing an electrolytic polymerization solution containing a monomer and a dopant agent into contact with a first cation-exchange resin; and performing electrolytic oxidative polymerization in the first electrolytic polymerization solution to form the electrically conductive polymer layer on the electrically conductive precoat layer.

6. The method according to claim 5, further comprising: preparing a second electrolytic polymerization solution by bringing the first electrolytic polymerization solution into contact with a second cation-exchange resin in the course of the electrolytic oxidative polymerization; and performing electrolytic oxidative polymerization in the second electrolytic polymerization solution to form the electrically conductive polymer layer.

7. The method according to claim 6, wherein the second cation-exchange resin is at least one selected from the group consisting of an acid (H)-type cation-exchange resin and a metal salt-type cation-exchange resin.

8. The method according to claim 5, wherein the first cation-exchange resin is at least one selected from the group consisting of an acid (H)-type cation-exchange resin and a metal salt-type cation-exchange resin.

9. A solid electrolytic capacitor produced by the method according to claim 5.

* * * * *